Oct. 23, 1928.

M. ALDEN 1,688,772

RADIO SET CONNECTION

Filed Oct. 5, 1926      4 Sheets-Sheet 1

INVENTOR
Milton Alden,
BY
ATTORNEY

Oct. 23, 1928.
M. ALDEN
1,688,772
RADIO SET CONNECTION
Filed Oct. 5, 1926    4 Sheets-Sheet 2
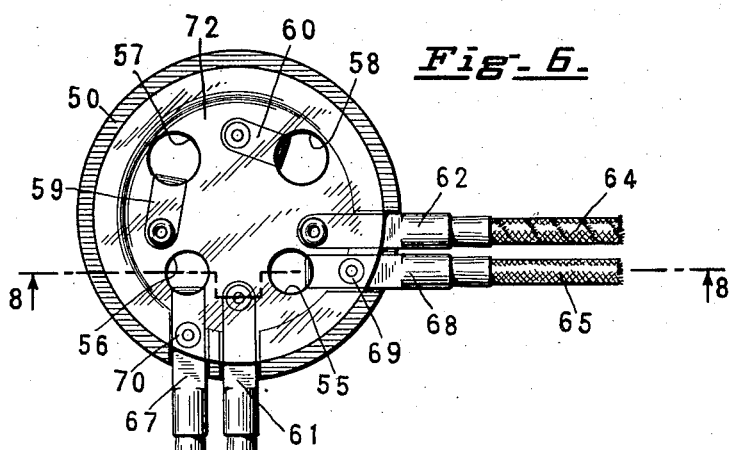
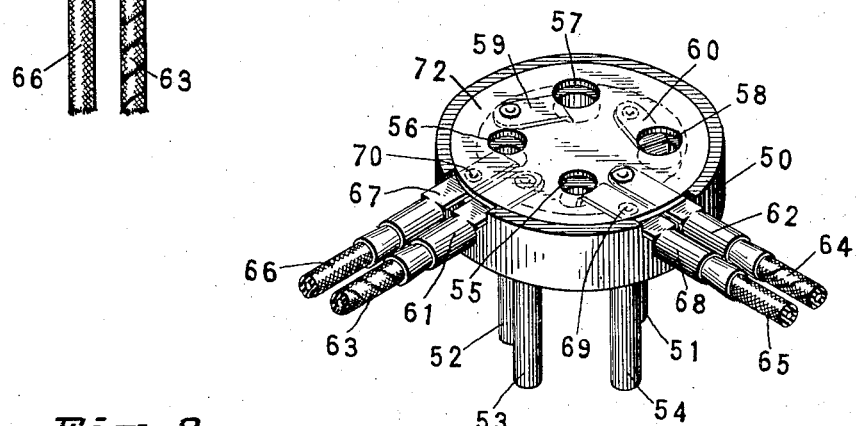
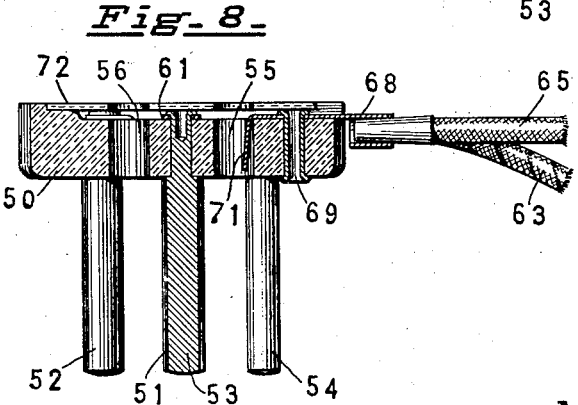
INVENTOR
Milton Alden,
ATTORNEY Oct. 23, 1928.
M. ALDEN
1,688,772
RADIO SET CONNECTION
Filed Oct. 5, 1926 4 Sheets-Sheet 3
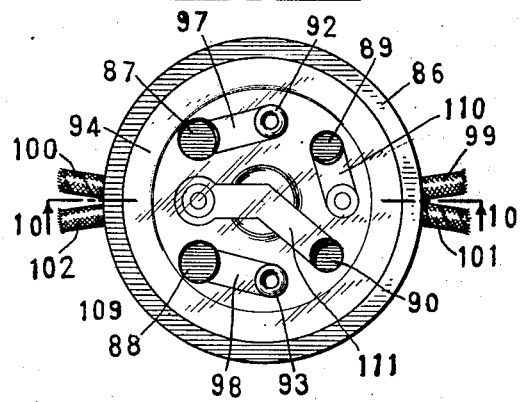
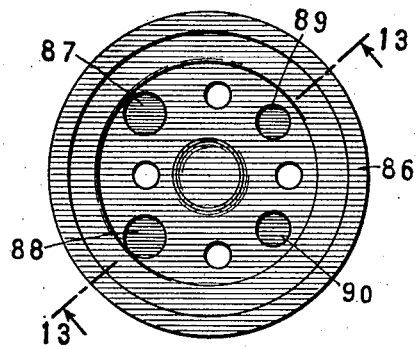
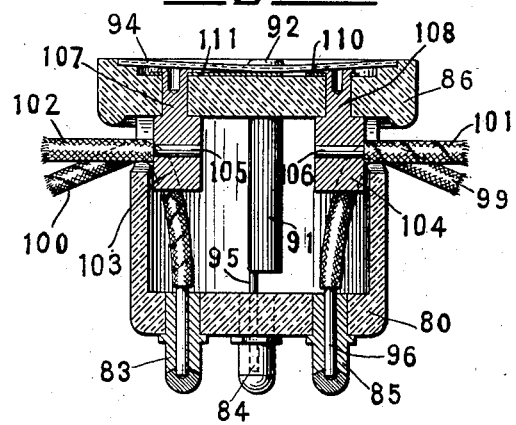
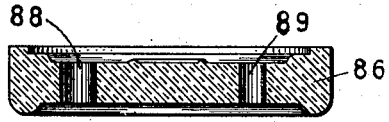
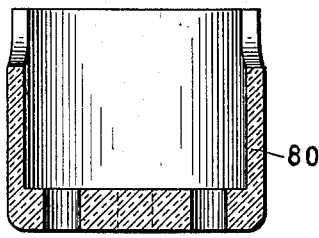
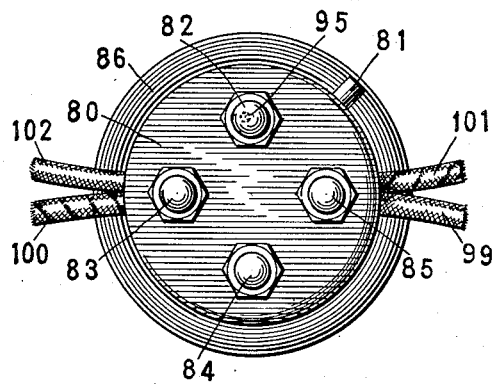
INVENTOR
Milton Alden,
BY
ATTORNEY

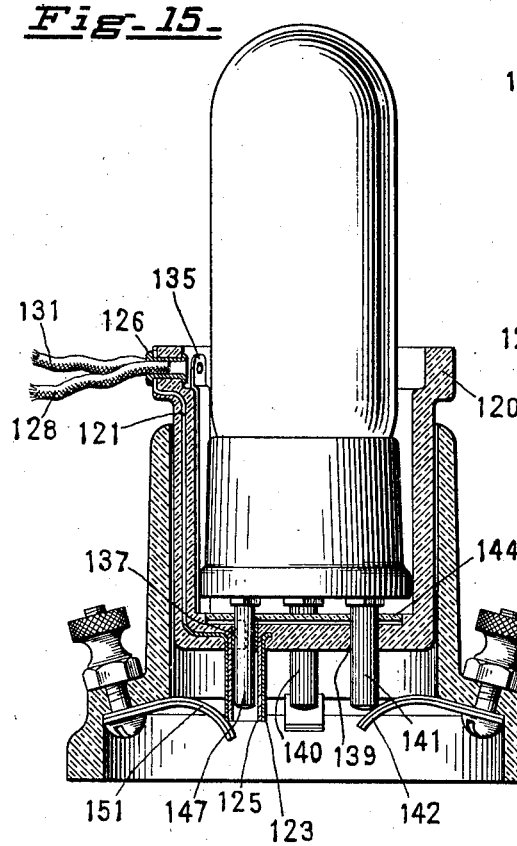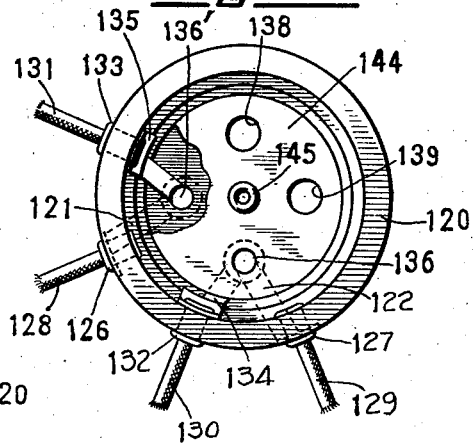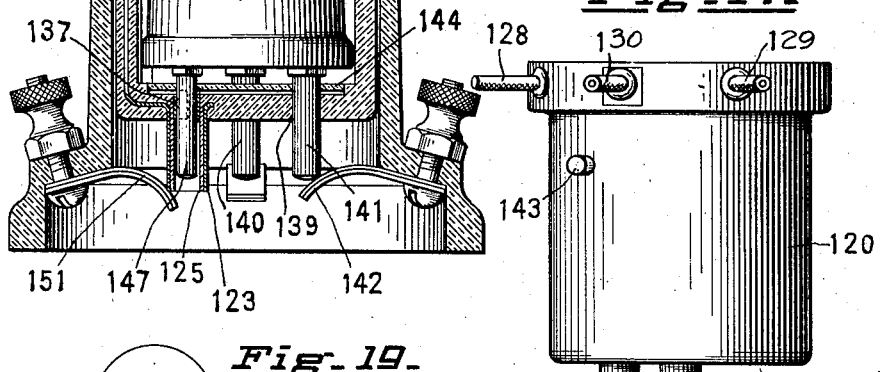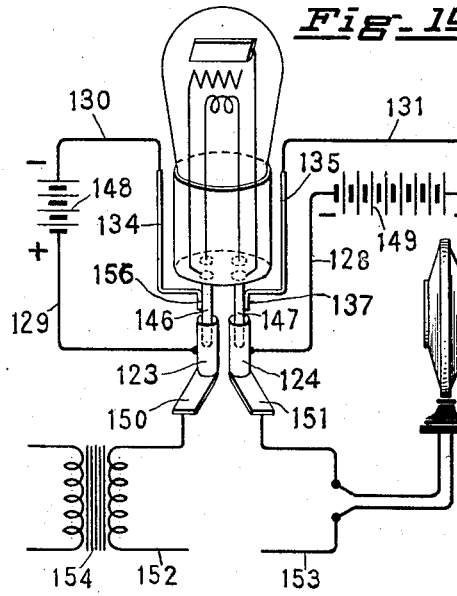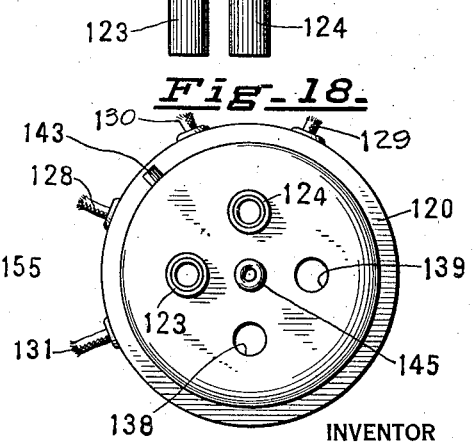

Patented Oct. 23, 1928.

1,688,772

UNITED STATES PATENT OFFICE.

MILTON ALDEN, OF SPRINGFIELD, MASSACHUSETTS.

RADIO SET CONNECTION.

Application filed October 5, 1926. Serial No. 139,657.

My invention relates to what may be termed auxiliary connecters or adapters for what are commonly termed vacuum tubes.

One object is to make possible the leading of the plate or grid terminals or the terminals ordinarily associated with the plate or grid from a tube socket in any set without disturbing the wiring of this set.

Another object is to bring out connections from any stage, radio frequency, detector or audio frequency of a receiver for introduction into, and further amplification in another receiver without disturbing the permanent wiring of either, thus making it possible to cross connect or bridge so that for instance the output of the radio frequency circuit of one set may be introduced into the detector circuit of another set and further amplified by the audio frequency circuits of this latter.

In many receivers the radio frequency and detector components are satisfactory but the faithfulness and power of the audio frequency components has not kept pace with the art so that by means of my invention a satisfactory audio frequency amplifier may be connected in without disturbing the original receiver.

Another object is that the last stage of audio frequency may be cut out and an exterior power amplifier substituted without change of the receiver.

Another object is to make easy the testing or comparison of transformers in a factory built receiver without disturbing the internal connections.

Another object is to make easy millimeter measurements or the insertion of other testing apparatus into the various stages without disturbing the wiring of the receiver.

Another object is to make easy the insertion of additional grid or plate voltages in any one or more of the tubes of the receiver without change of these voltages in the remaining tubes.

Another object of my invention is to facilitate the insertion and regeneration or degeneration in any part of the receiver without mechanically breaking the existing connections.

Another object is to facilitate the insertion of a microphone so that the audio frequency amplifier and loud speaker may be used for public address or other purposes.

Another object is to facilitate the insertion of a phonograph-operated microphone so that the audio frequency amplifier and loud speaker may be used to produce the high quality of music associated with the electrical phonograph.

It will be evident that by means of my invention a large amount of experimentation and temporary alteration can be conducted with any radio receiver and at the same time within a few moments and without the use of tools this receiver may be put back into its original condition.

Fig. 6 is a plan view of another form of my invention.

Fig. 7 is a perspective view of the device of Fig. 6.

Fig. 8 is a sectional view of the same along the line 8—8 of Fig. 6.

Fig. 9 is a top view of still another form of my invention.

Fig. 10 is a central vertical section along the line 10—10 of Fig. 9.

Fig 11 is a bottom view of Fig. 9.

Fig. 12 shows the top plate of Fig. 9.

Fig. 13 is a section of the top plate along the line 13—13 of Fig. 12.

Fig. 14 is a vertical sectional view of the lower part of the body of Fig. 10.

Fig. 15 shows a sectional view of still another form of my invention carrying a vacuum tube and inserted in a socket of standard type, the latter also shown in section.

Fig. 16 is a top plan view of this form of my invention with its bottom plate partially broken away.

Fig. 17 is an elevation of this form of my invention, and Fig. 18 is a bottom view.

Fig. 19 shows a schematic wiring diagram of one of the uses of my invention.

Fig. 23 is a vertical sectional view of the device of Figs. 20 to 22.

Figure 1:
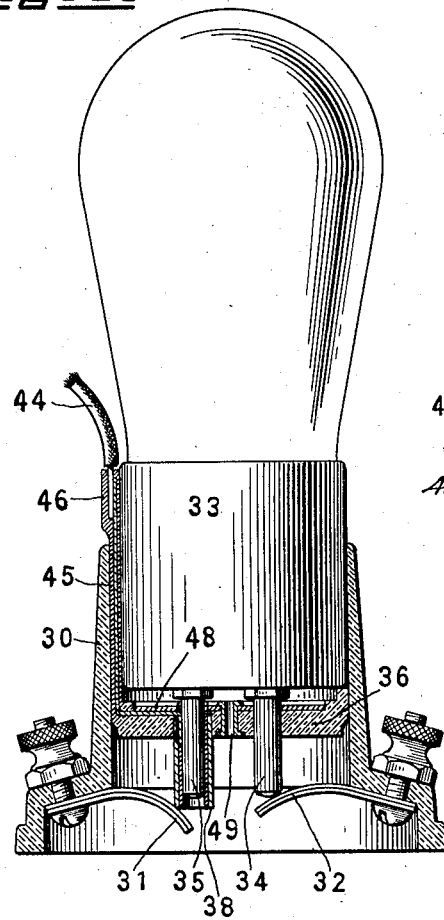
Fig. 1 shows a sectional view of one form of my invention carrying a vacuum tube and inserted in a socket of standard type, the latter also shown in section.
Figure 2:
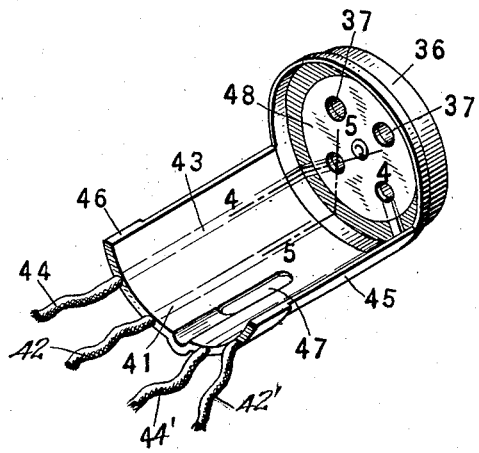
Figs. 2 and 3 are perspective views of this form of device.
Figure 3:
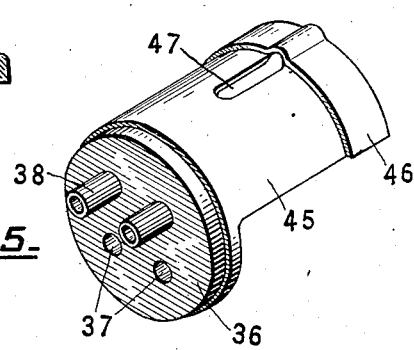
Figure 4:
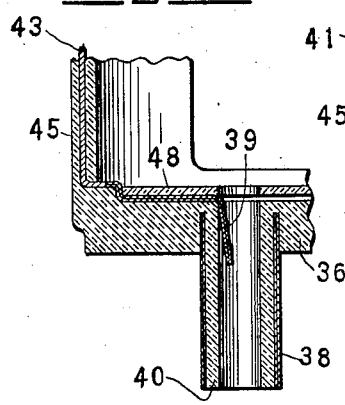
Fig. 4 is an enlarged fragmentary sectional view along the line 4—4 of Fig. 2.
Figure 5:
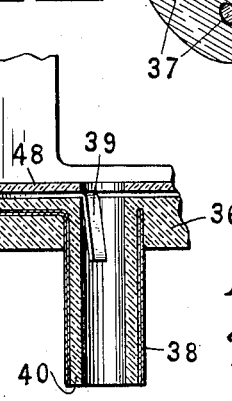
Fig. 5 is an enlarged fragmentary sectional view along the line 5—5 of Fig. 2.

The construction illustrated on sheet 1, Figs. 2 and 3 is intended to serve as a convenient means for inserting additional voltage in the plate and grid circuits of receiving sets fitted with the so-called Navy type socket without disturbing the internal wiring of the set when it is desired to use the UX112, UX171, or UX210 or equivalent vacuum tubes in place of the 201-A or similar type. In such a construction the socket 30 has four contacts such as 31 and 32. The tube 33 has two prongs such as 34 connected to the filament and two prongs such as 35 connected to the plate and grid. The novel connecter shown in Figs. 2 and 3 has an insulating bottom disc 36 with passages 37 for the filament prongs 34. This insulating disc is provided with two projecting contact members 38 which are for convenience made tubular and adapted to engage the contacts 31 of the socket. The base is also provided with side contacts 39 which are adapted to be engaged by the prongs 35 of the tube. The contacts 38 and 39 are insulated from each other by the insulating tube 40 which also serves to insure complete insulation of the tube prongs 35 from the contacts 38.

On account of the very small space available between the base of the tube and the wall of the socket for the conducting parts the contacts 38 and 39 are preferably formed of very thin metal which may be folded to provide double thickness at such points as are desirable. The outer contact 38 is rolled into tubular form and provided with an integral extension 41 to which the circuit wire or conductor 42 may be soldered. The insulation 40 serves to reinforce this contact 38. The contact 39 is also preferably formed integrally with the strip 43 to which may be soldered the circuit conductor 44. The conducting strips 41 and 43 are insulated, contained within and also held in position by means of a thin insulating wall 45 which may be formed of silk impregnated with some insulating material and united with the disc 36 in the molding process. Conductors 42' and 44' may be connected to contacts (not shown) in exactly the same way as conductors 42 and 44. Preferably the shell or layer 45 is thickened at its upper edge 46 so as to provide the reinforcing rim in which the connections between the conductors 42 and 44 with the strips 41 and 43 respectively are embedded. This wall 45 is provided with a slot 47 for the locking pin which is sometimes provided on a tube base. In the bottom of the connecter I preferably provide a thin insulating disc 48 to cover parts of the strips 41 and 43. The disc may be held in place conveniently by a tubular rivet 49.

The construction illustrated on sheet 2, Figures 6, 7 and 8 is intended to serve as a convenient means for inserting additional voltages or apparatuses in the plate and grid circuits of certain tubes of receiving sets which are provided with the push-pull type of socket but are not provided with separate leads for the insertion of the special voltages required by the UX112, UX171, UX210 or equivalent types of so-called power amplifier tubes. In this construction the insulating disc 50 carries four prongs 51, 52, 53, 54 which are similar in size and positioning with the terminals of a UX201 type vacuum type. In this disc are four perforations 55, 56, 57 and 58 registering with the prongs of the vacuum tube to be employed.

The upper ends of the larger prongs 51 and 52 which carry the cathode heating current are riveted to the conducting strips 60 and 59 respectively. The ends of these strips are bent over into the perforations 57 and 58 forming yieldable contact members for engaging the filament prongs of the vacuum tube (not shown). The upper ends of the smaller prongs 53 and 54 which correspond to the plate and grid prongs of a vacuum tube are riveted to the terminal members 61 and 62 to which are attached the flexible conductors 63 and 64. These conductors are usually led to the positive terminal of the additional grid battery and to the negative terminal of the additional plate battery.

The leads 65 and 66 which are usually connected to the remaining terminals of the above named batteries are attached to the conductors 68 and 67 which are in turn secured to the disc 50 by the tubular rivets 69 and 70. The ends of these conductors extend into the perforations 55 and 56 and are bent downward to form yieldable contacts, such as 71, which engage plate and grid prongs of the vacuum tube. An insulating plate 72, for instance of celluloid is secured to the top of the disc 50 as a protective measure.

The form illustrated on sheet 3 Figures 9 to 14 is to facilitate the use of the UX120 vacuum tube with its additional plate and grid voltages in receiving sets equipped with sockets designed to take the UV199 tube. The insulating shell or base 80 is of a size and shape similar to the base of a UV199. This base is provided with a locking pin 81 and four contact studs 82, 83, 84 and 85 corresponding to the pins or prongs upon the base of the above named tube.

The shell 80 is provided with a disc or top piece 86 having four perforations 87, 88, 89, and 90 to receive the prongs of the UX120 type of vacuum tube. Two rods, such as 91 are passed through the top 86 and through the insulating disc 94 which is constructed, for instance of celluloid and serves as a protection for the various conducting parts. These rods are drilled or hollowed at their upper ends and are headed over or riveted at 92 and 93 serving to hold the parts 86 and 94 together. At their lower ends each of the rods such as 91 has an extension such as 95 which extends into the upper end of the terminal prongs 82 and 84 respectively. Secured to the upper ends of the rods such as 91 but below the disc 94 are the conducting and contacting strips 97 and 98 which are bent over into the apertures 87 and 88 and form yieldable contacts for engaging the filament prongs of the vacuum tube (not shown).

The insulated flexible leads 99 and 100 have the insulation stripped from their ends (such as 96) and are passed through the studs 85 and 83, and are soldered thereto. These leads are generally connected to the positive of the additional grid battery and the negative of the additional plate battery. The leads 102 and 101 are generally connected to the remaining terminals of the above named batteries and have their ends 105 and 106 stripped for a short distance of their insulation and secured in the bosses 103 and 104. These bosses carry at their upper ends the hollowed projections 107 and 108 which are passed through the top piece or disc 86 and headed over upon the contacting and conducting strips 111 and 110. These strips have their ends bent downward into the apertures 90 and 89 of the top plate 86 forming yieldable contact members to engage the plate and grid prongs of the tube (not shown). It will be seen that this device enables the insertion in the circuit of extra batteries or other apparatus between the grid contact of the socket (not shown) and the grid prong of the tube, and between the plate contact of the socket and the plate prong of the tube.

The construction on sheet 4, Figs. 15, 16, 17, 18 is intended to serve as a convenient means for the insertion of additional batteries or other apparatus into the plate or grid circuits of the UX199 or UX120 or similar types of vacuum tube without disturbance of the internal wiring of the receiver and at the same time adapt the above mentioned tubes to the so-called "Navy" type socket generally used with the UV 201A or similar type of tube. The hollow shell 120 is preferably moulded of insulating material. Within the wall of this shell are moulded, or otherwise inserted, the conducting strips 121 and 122 terminating in the hollow cylindrical contacting members 123 and 124. These members have an inner insulating wall such as 125 preferably moulded integral with the bottom of the shell 120.

The upper ends of the strips 121 and 122 terminate under the heads of the tubular rivets 126 and 127 to which are soldered the flexible leads 128 and 129 which are generally connected to the positive terminal of the additional grid battery to be inserted and to the negative terminal of the additional plate battery. The leads 130 and 131 are connected to the remaining terminals of the above named batteries (not shown) and are soldered to the tubular rivets 132 and 133. The inner ends of the latter rivets are passed through perforations in upper ends of the contacting and conducting strips 134 and 135. These strips 134 and 135 pass downwardly along the inner wall of the shell 120, inwardly along the bottom of said shell, and then downwardly into the apertures 136 and 136' forming yieldable contact members such as 137 to engage the plate and grid prongs such as 147 of the vacuum tube.

The filament prongs 140 and 141 pass through the apertures 138 and 139 of shell 120 and engage directly with the socket contacts such as 142. The shell 120 is provided with a locking pin 143 similarly positioned to the equivalent member of a UV201-A tube base. A bottom plate 144 of insulating material, preferably celluloid, is provided and may be held in place by the tubular rivet 145.

One of the uses to which this device may be put is schematically illustrated in Fig. 19 similar parts bearing similar reference numbers to those just used. The secondary lead 152 of the audio frequency transformer 154 is usually connected by the set manufacturers to a low value of C battery or to the negative terminal of the filaments. The other secondary lead is connected to the socket contact 150 which with the insertion of the device described in turn makes contact with the tubular member 123. This member is connected by the flexible lead 129 to the positive pole of the added C battery 148. The negative terminal of this battery is connected through the flexible lead 130 to the yielding contact member 156 and thence through the prong 146 to the grid of the tube.

One lead 153 from the loud speaker 155 is connected to the positive terminal of the common B battery (not shown). The other loud speaker lead is connected through the set wiring to socket contact 151, thence through the tubular member 124 through the flexible lead 128 to the negative terminal of the added B battery 149. The positive terminal of this battery is connected through the flexible lead 131 to the yielding contact 137 and thence to the prong 147 and the plate of the vacuum tube. It will be seen that when the novel connector is removed and the original tube reinserted, the receiver will be in exactly its original state.

The construction shown in Figs. 6 to 14 hereof are claimed specifically in my application #262,081 filed March 16, 1928.

I claim:

1. A vacuum tube connector comprising an insulating base having a cylindrical flange and adapted to receive a vacum tube base and having four openings for the tube prongs and having outer tubular contacts extending from two of said openings, inner contacts within said tubular contacts but insulated therefrom and conductors in the flange of said socket connected to said outer and inner contacts respectively.

2. A vacuum tube connector comprising an insulating base having holes for the reception of the prongs of a vacuum tube, a contact tube extending from the base around one of said holes, a prong contact supported by said base within said tube but insulated therefrom, a thin insulating flange extending from said base and adapted to lie between the tube base and a socket shell and an electric conductor embedded in said flange and connected to said contact tube.

3. A vacuum tube connector comprising an insulating base having holes for the reception of the prongs of a vacuum tube, an insulating tube extending from around one of said holes, a circuit terminal on the outside of said insulating tube, a thin insulating flange extending from said base and adapted to lie between the tube base and a socket shell and an electric conductor embedded in said flange and connected to said circuit terminal on the outside of said insulating tube and another conductor embedded in said shell and terminating in a contact extending into one of said holes.

4. A connector for vacuum tubes comprising an insulating base having passages extending through it for the prongs of a tube, a conducting strip having a terminal for an external connection and having a portion extending across the upper surface of the base and terminating in an inclined contact tip in one of said passages and an insulating disc overlying said strip and base and having holes registering with said passages.

5. A vacuum tube connector comprising an insulating base having a bottom wall with passages for the prongs of a tube and a side wall projecting substantially at right angles to the bottom wall and adapted to be inserted in a socket having spring contacts for the prongs of a tube, said base having a tubular insulating projection with a passage in line with one of the passages in the base and adapted to receive a tube prong and a conducting strip embedded in said side wall and terminating in a contact portion at the lower end of the projection and adapted to engage a socket contact at the same time that a prong of a socket inserted through another passage in the base engages another socket contact.

6. A connector comprising two insulating members having openings for receiving tube prongs, a central rivet for securing said members together, spring contacts mounted within one member and having conducting strips secured between said members, said strips having portions extending from between the outer edges of said members to form circuit terminals.

7. A connector comprising an insulating base having passages for the prongs of a vacuum tube and having a peripheral insulating flange extending substantially at right angles to the base, a contact in at least one of said passages and a conducting strip connected to said contact and extending outwardly thru said flange.

8. A connector comprising an insulating base having passages for the prongs of a tube and having a peripheral flange, a conducting tube secured to said base and having an opening in line with one of said passages, and a conducting strip mounted within said flange and connected to said tube.

9. A connector comprising an insulating base having passages for tube prongs, a contact in at least one of said passages, a conducting tube extending from said base and having a passage in line with the passage in the base containing said contact and conducting strips connected to said contact and to said conducting tube respectively.

10. A connector comprising an insulating base having four passages for tube prongs, tubular contacts projecting from around two of said passages, a contact mounted within the base of one of said tubular contacts and circuit terminals connected to the respective contacts.

MILTON ALDEN.